March 30, 1965 C. B. VAUGHAN 3,176,157

FUNCTION GENERATOR

Filed April 19, 1962 2 Sheets-Sheet 1

INVENTOR.
CARROLL B. VAUGHAN
BY Herbert L. Harris
ATTORNEY

March 30, 1965 C. B. VAUGHAN 3,176,157

FUNCTION GENERATOR

Filed April 19, 1962 2 Sheets-Sheet 2

INVENTOR.
CARROLL B. VAUGHAN
BY Herbert L. Davis

ATTORNEY

United States Patent Office 3,176,157
Patented Mar. 30, 1965

3,176,157
FUNCTION GENERATOR

Carroll B. Vaughan, East Orange, N.J., assignor to The Bendix Corporation, Teterboro, N.J., a corporation of Delaware Filed Apr. 19, 1962, Ser. No. 188,678
9 Claims. (Cl. 307—88.5)

The invention relates to function generators and more particularly to function generators of the capacitive discharge type.

An object of the invention is to provide a novel function generator.

Another object of the invention is to provide a novel function generator having extremely fast rise time and good fall time.

Another object of the invention is to provide a novel function generator having a low (theoretical zero) source impedance.

Another object of the invention is to provide a novel function generator capable of driving into a purely reactive load.

Another object of the invention is to provide a novel function generator capable of producing a signal attenuable from either the positive to negative direction or the negative to positive direction.

Another object of the invention is to provide a novel function generator having fast rise time, good fall time, low source impedance, the ability to feed into capacitive load, both positive and negative attenuable output and having two outputs at 180° phase shifted from the other.

Another object of the invention is to provide a novel function generator having an improved power transfer ratio.

The invention is a novel function generator that provides a plurality of selectable wave forms including, for example, a pulse, a step, square waves, and a train of spikes at low frequency and high frequency or of adjustable frequency and of adjustable duty cycle. Each one of these wave forms is attenuable, capable of polarity reversal, and is floating. By floating, it is meant that the generated function is adjustably referenced to a common point. By attenuable, it is meant that the signal level of the generated function can be reduced from the positive to negative directions and vice versa, or explained in terms of binary logic, the logic "one" signal level voltage can be reduced from logic "one" level to the logic "zero" level and vice versa. It is also desirable that the wave forms of the function generator have a fast rise time and a good fall time with capacitive and inductive loads.

Summarized below are eleven features of the novel function generator which is shown in two alternative embodiments in FIGURES 1 through 5.

(1) A theoretical zero source impedance,
(2) Ability to drive into a capacitive load,
(3) Very fast rise time,
(4) Very good fall time,
(5) Attenuation from maximum to minimum of a positive going step, pulse, or other wave form,
(6) Attenuation from maximum to minimum of a negative going step, pulse, or other wave form,
(7) The output wave form is adjustably floating,
(8) A second output inverted 180° from the first output,
(9) The output is functionable both at D.C. and at pulse conditions,
(10) Variable frequency, and
(11) A square wave output capability.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
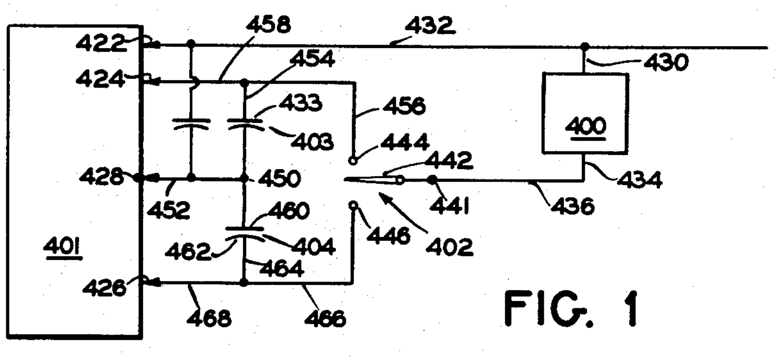
FIGURE 1 is a schematic drawing showing a basic novel function generator.

The basic operation of the novel function generator is described in conjunction with the schematic drawing of FIGURE 1 wherein there is shown an adjustable D.C. power supply 401, a two terminal load 400; a single pole double throw switch 402; and two large capacitors 403 and 404.

Figure 2:
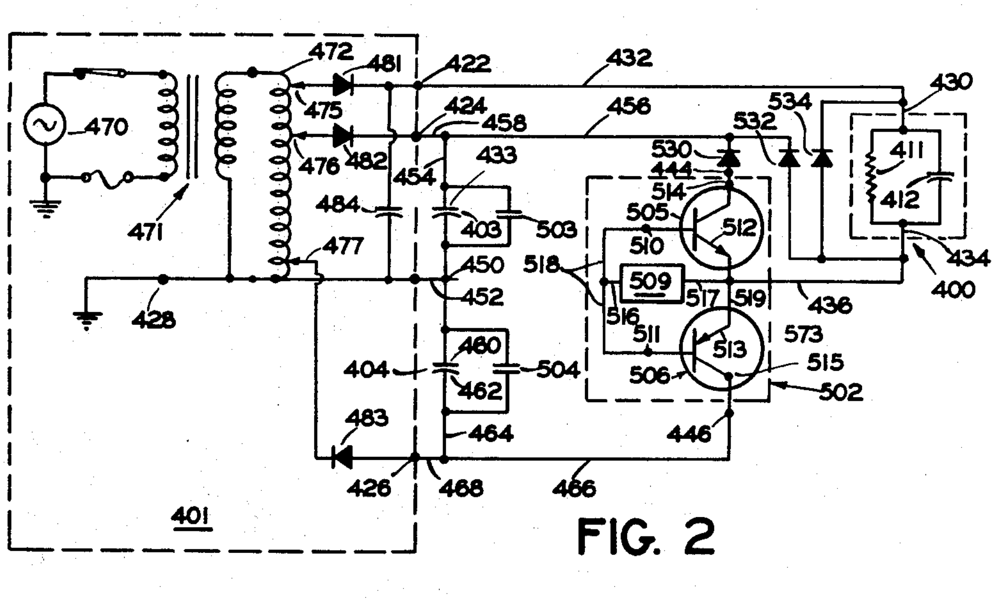
FIGURE 2 is a detailed wiring diagram of the novel function generator of FIGURE 1.

The floating power supply 401 may be of a conventional type such as a multiple tapped battery or a series connected dry or storage cell, or of a type such as shown in FIGURE 2 and described and claimed in U.S. application Serial No. 166,224, filed by Carroll B. Vaughan and assigned to The Bendix Corporation. The power supply 401 provides three separately adjustable D.C. voltages respectively at output terminals 422, 424, and 426. The voltages at terminals 422, 424, and 426 are floating with respect to ground, according to a voltage applied at a common terminal 428. The voltage available at the first terminal 422, also called the high positive terminal, is always positive with respect to common 428. The voltage available at the second voltage output terminal 424 called the positive or "one" terminal is always positive with respect to common 428, and is always smaller in magnitude than the voltage available at the high positive terminal 422. The voltage available at the third terminal 426, also called the negative or "zero" terminal, is always negative with respect to common 428.

The load 400 is of a two terminal type, with a positive side 430 connected by a conductor 432 to the high positive terminal 422. A negative side 434 of the load 400 is connected by a conductor 436 to a switch 402. The switch 402 in the FIGURE 1 is shown as a single pole double throw type switch, having a switch blade terminal 441 connected to the conductor 436, a switch blade 442, and two contacts 444 and 446.

The two capacitors 403 and 404 as shown in FIGURE 1 are serially connected together at a juncture 450 which is connected by a conductor 452 to the common terminal 428. The other plate 433 of capacitor 403 is connected by conductors 454 and 456 to one contact 444 of the switch 402. The plate 433 is also connected by conductors 454 and 458 to the positive output terminal 424 of the power supply 401. Thus, an instantaneous positive D.C. potential is always available at contact 444. This potential is stored across the plates of capacitors 403 and is equal in magnitude to the potential drop between the voltage available at the positive output terminal 424 and the common potential terminal 428.

Likewise, capacitor 404, as shown in FIGURE 1, is connected with its positive side, or positive plates 460, to common by the conductor 452; and its negative plate 462 is connected by conductor 464 and 466 to the second contact 446 of the switch 402. The negative plate 462 of capacitor 404 is also connected by conductor 464 and 468 to the negative adjustable source of D.C. voltage, available at the negative terminal 426. Thus, a negative potential (relative to common) of theoretical zero resistive impedance is always available at terminal 446 of switch 402.

By operating the switch blade 442 of the switch 402 in one position (e.g. 444) or in the other position (e.g. 446), the voltage across the load is abruptly changed. A feature of the novel function generator is that the negative side 434 of the load 400 is always fed by a source of D.C. voltage with substantially zero resistive source impedance, thus the rise and fall time of the voltage function applied to and as seen by the load 400 is very fast, regardless of the capacitance of the load 400.

The positive side 430 of the load 400 is held at a fixed potential equal to the potential available at the high positive terminal 422 while the negative side 434 of the load 400 receives a discontinuous potential according to the operation of switch 402. The two potentials available at contacts 444 and 446 of the switch 402 correspond to the logic "one" and the logic "zero" levels commonly required in computer operation. The "zero" and "one" levels are selected by adjusting the voltages available at the voltage output terminals 422, 424, and 426, and at the common potential terminal 428; furthermore, the voltage function is attenuable from either the "zero" or "one" level by adjusting the voltage at the "one" and "zero" terminals 424 and 426. These features are now pointed up by way of example.

Assume, for example, that the voltage available at terminal 422 is adjusted to +16 volts relative to common and voltage available at terminal 424 is +12 volts relative to common 428; and the voltage available at the "zero" terminal 426 is −12 volts relative to common 428, and the common voltage at terminal 428 is −16 volts relative to ground. Thus, the logic "one" level at terminal 424 is equal to +12 volts relative to common and −4 volts relative to ground and the logic "zero" level at terminal 426 is equal to −12 volts relative to common and −28 volts relative to ground. It is seen that the size of the signal between the logic "zero" and the logic "one" level is determined by the difference in voltage available at terminal 424 and 426; while the relative value of the logic "zero" and logic "one" with respect to ground are determined by the potential applied between the common terminal 428 and ground. The signal applied to the load 400 can be attenuated either in the positive going or negative going sense by adjusting the voltage available at the "one" or "zero" terminals 424 or 426. Thus, the voltage across load 400 is the sum of voltage from 422 to common plus voltage at 426 for switch 402 of FIGURE 1 in the down position 446; and difference of voltage between 422 and 424 for switch 402 in the up position.

FIGURE 2 is a detailed wiring diagram of the novel function generator of FIGURE 1, and like elements in the FIGURES 1 and 2 bear like legends. The power supply 401 of FIGURE 1 may be of any conventional or convenient type having three separate adjustable D.C. output voltages relative to a common potential and may be a multi-independent brush auto transformer of the kind described in Vaughan, U.S. application Serial No. 166,-224, filed January 15, 1962, and as shown in FIGURE 2. The power supply 401 of FIGURE 2 includes a source of electrical potential 470 which may, for example, be 117 volts A.C. commonly available applied to an isolation transformer 471 and then in to the winding of the multi-independent brush auto transformer 472 having at least three adjustable outputs 475, 476, and 477. The voltages at each output 475, 476, and 477 are applied respectively to the diode rectifiers 481, 482, and 483; and filter capacitors 484, 403, and 404. It is to be noted that when the function generator includes the power supply having a multi-independent brush auto transformer as shown in FIGURE 2 the filter capacitors of the power supply performs a dual function in that they rectify and act as charging capacitor for the function generator. In particular, the capacitor 403 is both the filter capacitor of the rectifying circuit of output terminal 476, and at the same time, is the charging capacitor for the function generator. Likewise, capacitor 404 is the filter capacitor for rectifying the alternating voltage available on terminal 477 and also is the storage charging capacitor for the function generator itself.

The load 400 is shown in FIGURE 2 as comprising a resistor 411 and a capacitor 412. The capacitor 412 may be actually part of the load or may be distributive capacitance or parasitic capacitance of the circuit, or of the system in which the function generator and load is a part. The size of the load capacitor 412 should be small in comparison with the size of the capacitors 403 and 404.

The switching action performed by the switch 402 of FIGURE 1 can be performed manually as shown therein or may be performed automatically by two transistors as shown in FIGURE 2. Referring to FIGURE 2 there is shown therein a basic function generator of FIGURE 2 (with the detailed power supply 401 as described above) and with a transistor switching circuit 502.

The switching circuit 502 comprises two transistors, an NPN transistor 505 and a PNP transistor 506 each having a base 510 and 511 respectively, and emitter 512 and 513 respectively, and a collector 514 and 515 respectively.

The bases 510 and 511 of the transistors 505 and 506 are tied together by a conductor 518; and the emitters 512 and 513 are tied together by a conductor 519. The emitters 512 and 513 are connected through conductors 519 and 436 to the negative side 434 of the load 400. The collector 514 of the NPN transistor 505 is connected by conductor 444 through a diode 530 and a conductor 456 to the positive side 433 of capacitor 403, and to the high positive or "one" terminal 424.

The collector 515 of the PNP transistor 506 is connected by conductor 446, 466, and 464 to the negative side 462 of the capacitor 404; and is also connected by conductors 464 and 468 to the negative, or "zero" terminal 426.

Each transistor 505 or 506 operates as a one way single pole switch with one switch open while the other is closed and vice versa.

The transistors 505 and 506 are made to alternatively conduct and be cut off by a driver circuit 509 of conventional type, connected between the bases 510 and 511, and emitters 512 and 513 of the transistors 505 and 506 by conductors 516 and 518, 517 and 519. The driver circuit 509 is a conventional multifunction generator, operator operative, for producing a plurality of wave forms, e.g. step, pulse, square waves, and pulse trains of variable frequency and duty cycle. The application of a positive signal to the bases 510 and 511 relative to emitters 512 and 513 by driver circuit 509 through conductors 516 and 518 respectively, will cause the NPN transistor 505 to conduct and the other PNP transistor 506 not to conduct.

The application of an electrical signal from the driver circuit 509 through conductors 516 and 518 to the bases 510 and 511 of a negative polarity, relative to the electrical signal applied to the emitters 512 and 513, will cause the other transistor PNP 506 to conduct and the first transistor NPN 505 not to conduct. Thus, the frequency, and the duty cycle, as well as D.C. operation of the driver circuit 509 is faithfully reproduced by the function generator. The PNP transistor 506 is used in charging circuits corresponding to the switch blade 442 of switch 402 being in the "down" position in contact with contact 446. The NPN transistor 505 is used in the discharge circuit corresponding to the switch blade 442 of switch 402 in the "up" position making contact to contact 444.

The chief disadvantage of the arrangement shown is that driver 509 is isolated and floating in that it is not grounded or otherwise connected to common potential, and in particular, its power must be supplied by a floating power supply.

Three diodes 530, 532, and 534 are included in the circuit. Their functions are explained each in turn. The diode bearing legend 530 is a blocking diode and is connected from the collector 514 of the transistor 505 to the positive plate 433 of capacitor 403. Its function is to prevent the NPN transistor 505 from receiving a reverse voltage.

The clamping recharge diode 532 is connected in the negative side 434 of load 400 to the positive plate 433 of the capacitor 403. It functions as a clamp to prevent the capacitor 412 of the load 400 from discharging through the resistor 411 of the load 400 when the NPN transistor 505 is in a conducting state, and thus prevents the load from discharging beyond the logic "one" level.

A protecting diode 534 is mounted back biased across the load with anode to the negative side 434 and cathode to positive side 430 of the load, to prevent reverse surge currents across the transistors 505 and 506. With the load shown, there will be no reverse inductive surge current upon the switching of the transistors 505 and 506. However, reverse inductive surge currents will appear when the load is inductive.

The size of the load capacitor 412 (which is shown including the distributed or parasitic capacitance of the circuit) should be smaller than the charging capacitors 403 and 404 to alternately permit the charging capacitor to discharge into the load capacitor 412, and the load capacitor 412 to discharge to the difference voltage between 484 and 403. Thus the charging capacitor should always be at least ten times greater than the load capacitor 412.

In practice, the charging capacitors 403 and 404 may, for example, be on the order of 1000 microfarads. The presently commercially available capacitors of this size have leakage resistances and inductances which interfere with quick charging and discharging; thus a small capacitor 503 and 504 is added in parallel with each larger capacitor 403 and 404; such small capacitors being of very high quality to provide upon switching the initial rise or fall of charge to or from the load.

In practical construction of this circuit, there are parasitic and distributed capacitances throughout the circuit wiring and component relations of load. These capacitances are considered as loads for the function generator and several such capacitances are shown as lumped capacitances in the schematic drawing of FIGURE 3 (which is the same as FIGURE 2 but includes several parasitic and distributed capacitances).

Figure 3:
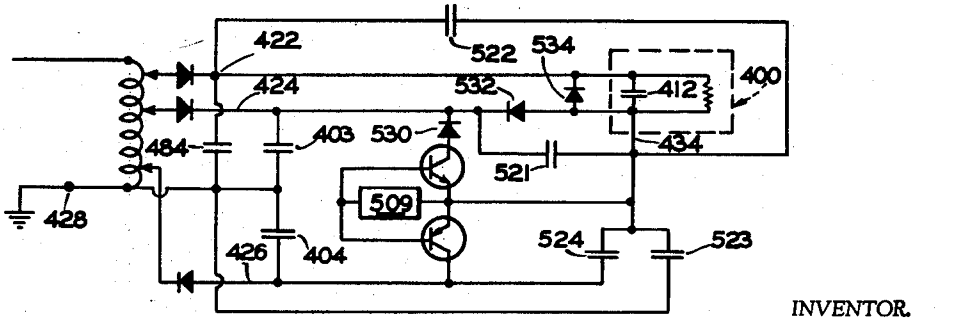
FIGURE 3 is a wiring diagram of the novel function generator of FIGURE 2 and showing parasitic capacitance in the circuit.

In particular, there is shown in FIGURE 3 a capacitance 521 between the negative side 434 of the load 400 and the positive power supply terminal 424, a capacitance 522 between the negative side 434 of the load 400 and the high positive power supply terminal 422, a capacitance 523 between the negative side 434 of the load 400 and the common terminal 428, a capacitance 524 between the negative side of the load and the negative power supply terminal 426. All of these capacitances are small and are effectively charged or discharged every time switch 502 operates. They do not effect the operation of the function generator in any manner. There are also other parasitic and distributed capacitances in the circuit but these capacitances do not adversely effect the operation of the novel function generator.

Figure 4:
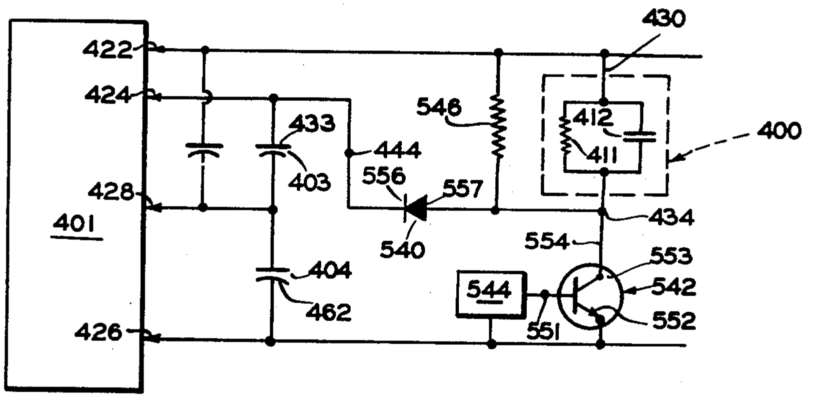
FIGURE 4 is a wiring diagram of a modified form of the novel function generator.

An alternative embodiment of the novel function generator is shown in FIGURE 4 wherein the power supply 401, the two charging capacitors 403 and 404, and the load 400 are all interconnected as before and bear the same legends as in the preceding three figures. The switching action is performed by the combination of a diode 540, a transistor 542 and a driver circuit 544. The diode 540 is connected forward biased from the negative side 434 of the load 400 to the positive plate 433 of capacitor 403. Thus when transistor 542 is nonconducting, the negative side 434 of the load is directly connected to the potential of the logic "one" terminal 424 of the power supply 401.

Transistor 542 is a NPN transistor having a base 551, emitter 552, and collector 553. The collector 553 is connected by conductor 554 to the negative side 434 of the load 400. The emitter 552 is connected to the negative plate 462 of the charging capacitor 404.

The base 551 is connected to an output of a driver circuit 544. The driver circuit applies to the base 551, signals to make the transistor 542 conduct or nonconduct. When the transistor 542 is conducting, the negative side 434 of the load 400 is directly connected to the negative terminal 426 and to the plate 462 of capacitor 404, so that the logic "zero" potential at plate 462 of the capacitor 404 and terminal 426 is impressed on the load, and there is an electron flow from the charge stored on capacitor 404 through transistor 542, (from the emitter 552 to the collector 553) and into the load 400 charging the capacitance 412 of the load 400. Thus, when the transistor goes from nonconducting to conducting, the load receives a voltage change with almost zero rise time, because the source impedance seen by the load is purely reactive.

When the transistor 542 switches from a conducting to a nonconducting state, the charged capacitors 412 of the load cannot discharge through the transistor 542 or through the diode 540. In particular, the load capacitor 412 is charged to the high positive potential (for example, +16 volts) on its positive side 430; and charged to the "zero" negative potential (for example, −12 volts) on its negative side 434. The diode 540 is nonconducting being backed biased with its cathode 556 at the positive potential of terminal 424, (for example, at +12 volts) and its anode 557 at a lower potential (in this example, −12 volts). The only path for the capacitor 412 to discharge is through the load resistance 411. For high resistance in 411, the time constant of the discharge is slow and produces a poor fall time. To speed up the fall time, a speed up shunt load resistor 546 is added in parallel with the load. This is a resistor having a resistance such that the time constant of the load capacitance 412 times the parallel combination of the speed up shunt load resistor 546 with the load resistor 411 is small. Once the capacitor 412 of the load has discharged through the parallel combination of the speed up shunt load resistor 546 and the load resistor 411 to a potential, (in this example, equal to the logic "one" level, i.e. to +12 volts), the diode 540 becomes conducting and clamps the negative side 434 of the load 400 to the "one" potential level, (in the example, +12 volts). An advantage of the alternative embodiment of FIGURE 4 is that driver 544 has a common connection and therefore is not floating as is the driver 509, in the circuit of FIGURE 2.

Figure 5:
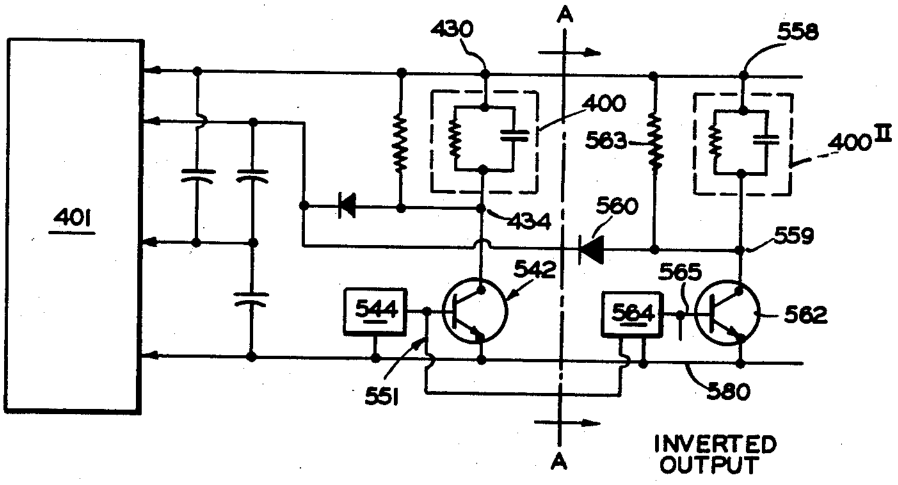
FIGURE 5 is a wiring diagram of another modified form of the novel function generator showing the function generator with two outputs.

FIGURE 5 shows the circuitry by which the function generator supplies a second output inverted or 180° phase shifted from the first output. The function generator of the FIGURE 5 is similar to the generator of the preceding figures, and common elements bear the same legend. In FIGURE 5, there is a second pair of contacts 558 and 559 for a second load $400^{II}$. There is also a second diode 560 and a second speed up shunt load resistor 563 and an additional NPN transistor 562 having an inverter 564 between the output of the repeater circuit 544 and input to the additional transistor 562. The output wave form from the driver circuit 544 is fed to an inverter 564 which inverts the signal of the driver 544 and applies it to the base 565 of the transistor 562. The transistor 542 is turned on by the repeater circuit when the transistor 562 is turned off by the inverted signal from the inverter 564; and likewise transistor 542 is turned off when the transistor 562 is turned on. Thereby the part of the circuit to the right of the dotted line A—A operates 180° phase shifted from the part of the circuit to the left of the dotted line; and a load connected at terminals 558 and 559 sees a wave form 180° phase shifted with respect to a load connected between terminals 430 and 434.

The circuit of FIGURE 5 may be modified and simplified by replacing the inverter 564 and the transistor 562 by a single PNP transistor (not shown) with its collector at terminal 559 and its emitter at terminal 580, and its base receiving the output of driver 544 directly. The PNP transistor that replaces the inverter 564 and NPN transistor 562 must have matched compatible characteristics with NPN transistor 542. With this arrangement, the signal across load 400 and the inverted signal across load $400^{II}$ are symmetrically identical and 180° out of phase.

While several embodiments of the invention have been illustrated and described, various changes in the form and relative arrangements of the parts,, which will now appear to those skilled in the art may be made without departing from the scope of the invention. Reference is, therefore, to be had to the appended claims for a definition of the limits of the invention.

What is claimed is:

1. A function generator comprising capacitive means having a plurality of terminals; a source of electrical potential connected to the capacitive means for impressing a potential at first and second terminals of the capacitor means; another source of a different electrical potential and an electrical load serially combined with said other source and having two terminals, one terminal of the series combined load and other source being connected to a third terminal of the capacitive means, and means to electrically connect the other terminal of the series combined load and other source alternatively to the first and second terminals of the capacitive means so as to effect a flow of current to and from said load in electrical circuits including said two terminals of the series combined load and other source.

2. A function generator comprising two capacitors serially connected, a first source of electrical potential applied at one end of the series connected capacitors, a second source of electrical potential applied at the other end of the series connected capacitors, a third source of a different electrical potential, an electrical reference potential connected to the first, second and third sources of electrical potential to the juncture of the two capacitors, a two terminal electrical load having one terminal of the load attached to the third source of different electrical potential, and a switching means for selectively connecting the other terminal of the load alternatively to one end of the series connected capacitors and to the other end of the series connected capacitors so as to effect a flow of electrical current from the load under the difference in the potentials of said first and third sources and alternatively under the difference in the potentials of said second and third sources.

3. A function generator comprising four adjustable sources of electrical potential and where the first source of potential being always less than the third, and the third potential being always less than the fourth potential, and where the first, third, and fourth potentials being floating with respect to the second potential; a first capacitor connected between the first and second sources of potential; a second capacitor connected between the second and third sources of potential; an electrical load having two terminals of opposite polarity, said electrical load being connected at one of said terminals to the fourth source of electrical potential; and a switching means connected to the other terminal of said electrical load for selectively connecting said other terminal of the load to the first and the third source of electrical potential so as to effect a flow of current into said one terminal of the load from the fourth source of greater potential and from said other terminal of the load to the selectively connected source of lesser potential.

4. A function generator comprising two capacitors serially connected, a first source of electrical potential applied at one end of the series connected capacitors, a second source of electrical potential applied at the other end of the series connected capacitors, a third source of a different electrical potential, an electrical reference potential connected to the first, second and third sources of electrical potential and to the juncture of the two capacitors, a two terminal electrical load having one terminal of the load attached to the third source of different electrical potential, and a switching means for selectively connecting the other terminal of the load alternatively to one end of the series connected capacitors and to the other end of the series connected capacitors; said switching means including a NPN and a PNP transistor each having a base, an emitter, and a collector and with the bases joined together and with the emitters joined together, said emitters connected to the other terminal of the load and with the collector of the NPN connected to the second source of electrical potential and with the collector of the PNP transistor connected to the first source of electrical potential, a driver circuit connected between the bases and emitters of said two transistors for selectively simultaneously making one transistor conduct and the other nonconductive, a diode connected between the other terminal of the load and the second source of electrical potential for maintaining the load in a fixed electrical potential when the NPN transistor is conducting, a second diode connected from the collector of the NPN transistor to the second source of electrical potential to bar reverse voltage from said transistor, and a third diode back biased across the load to bar any inductive surge of the load from the transistors upon the NPN transistor beginning conduction simultaneously with the PNP transistor beginning nonconduction.

5. A function generator comprising two capacitors serially connected, a first source of electrical potential applied at one end of the series connected capacitors, a second source of electrical potential applied at the other end of the series connected capacitors, a third source of a different electrical potential, an electrical reference potential connected to the first, second and third sources of electrical potential and to the juncture of the two capacitors, a two terminal electrical load having one terminal of the load attached to the third source of different electrical potential, and a switching means for selectively connecting the other terminal of the load alternatively to one end of the series connected capacitors and to the other end of the series connected capacitors; said switching means including a diode connected forward biased from the other terminal of the load to the second source of electrical potential, a transistor having a base, an emitter, and a collector and with the emitter and the collector serially connected between said other terminal of the load and the first electrical potential, reversing means applied to the base of said transistor for selectively making said transistor conduct and nonconduct and a shunting speed up resistor connected in parallel with the load to permit any capacitance of the load to discharge after the transistor has gone from a conducting to nonconducting state.

6. A function generator comprising four adjustable sources of electrical potential including the first source of potential being always less than the third, the third potential being always less than the fourth potential, and the first, the third, and the fourth potentials being floating with respect to the second potential, a first capacitor connected between the first and second sources of potential, a second capacitor connected between the second and third sources of potential, a load having two terminals and including reactance elements, the load being connected at one of said terminals to the fourth source of electrical potential; and a switching means connected to said other terminal of the load for selectively switching said other terminal of the load alternatively to the first and the third source of electrical potential, said switching means including a NPN and a PNP transistor each having a base, an emitter, and a collector and with the bases joined together and with the emitters joined together, said emitters connected to the other side of the load, and with the collector of the NPN connected to the third source of electrical potential, and with the collector of the PNP transistor connected to the first source of electrical potential, a reversing circuit connected between the bases and emitters of said two transistors for selectively simultaneously turning on one transistor and turning off the other, a diode forward biased between the other side of the load and the third source of electrical potential for maintaining the load in a fixed electrical potential when the NPN transistor is in a conducting state, a second diode connecting from the collector of the NPN transistor to the third source of electrical potential to bar reverse voltage from said transistor, and a third diode back biased across the load to bar any surge of the load from the transistors upon the NPN transistor turning on simultaneously with the PNP transistor turning off.

7. A function generator comprising two capacitors serially connected, a first source of electrical potential applied at one end of the series connected capacitors, a second source of electrical potential applied at the other end of the series connected capacitors, a third source of a different electrical potential, an electrical reference potential connected to the first, second and third sources of electrical potential and to the juncture of the two capacitors, a two terminal electrical load having one terminal of the load attached to the third source of different electrical potential, and a switching means for selectively connecting the other terminal of the load alternatively to one end of the series connected capacitors and to the other end of the series connected capacitors; said switching means including a transistor having a base, an emitter, and a collector; the collector being connected to the other terminal of the load and the emitter connected to the first source of electrical potential; a driving circuit connected between the base and emitter for selectively rendering the transistor conducting and nonconducting; a diode connected from the collector to the second source of electrical potential; and a speed up shunt load resistor connected from the collector to the third source of electrical potential.

8. A function generator comprising two capacitors serially connected, a first source of electrical potential applied at one end of the series connected capacitors, a second source of electrical potential applied at the other end of the series connected capacitors, a third source of a different electrical potential, an electrical reference potential connected to the first, second and third sources of electrical potential and to the juncture of the two capacitors, a two terminal electrical load having one terminal of the load attached to the third source of different electrical potential, and a switching means for selectively connecting the other terminal of the load alternatively to one end of the series connected capacitors and to the other end of the series connected capacitors; said switching means including a transistor having a base, an emitter element and a collector element; one of said elements being connected to the other terminal of the load and the other of said elements being connected to the first source of electrical potential; a driving circuit connected between the base of the transistor and the first source of electrical potential for selectively rendering the transistor conducting and nonconducting; a diode connected from the juncture of the other terminal of the load with the one element of the transistor to the second source of electrical potential, and a speed up shunt load resistor connected across the load.

9. A function generator comprising two capacitors serially connected; a first source of electrical potential applied at one end of the series connected capacitors; a second source of electrical potential applied at the other end of the series connected capacitors; a third source of potential; first load means, second load means, said first and second load means being attached to the third source of electrical potential; and switching means for selectively connecting the first and second load means alternatively to one end of the series connected capacitors and to the other end of the series connected capacitors, said switching means including a pair of transistors each having a base connection, an emitter terminal, and a collector terminal, one of said terminals of each of said transistors being connected to the first source of electrical potential, and the other of said terminals of one of said transistors being connected to the first load means and the other of said terminals of the other of said transistors being connected to the second load means, a driver circuit means connected between the first source of electrical potential and the base connections of the transistors for selectively simultaneously rendering one of said transistors conducting and the other of said transistors nonconducting, and two diodes, one each of said diodes connecting a junction of the first and second load means with said transistors to the second source of electrical potential.

References Cited in the file of this patent

UNITED STATES PATENTS

| | | |
|---|---|---|
| 2,514,434 | Windes | July 11, 1950 |
| 2,916,702 | Bigelow | Dec. 8, 1959 |
| 2,991,372 | Blocher | July 4, 1961 |
| 3,049,630 | Sapino | Aug. 14, 1962 |